US007115806B2

(12) United States Patent
Holland

(10) Patent No.: US 7,115,806 B2
(45) Date of Patent: Oct. 3, 2006

(54) INTONATION AID AND POSITION LOCATOR FOR VIOLIN FAMILY OF INSTRUMENTS

(76) Inventor: Randy Holland, 200 Rosa Dr., Fairfield, VA (US) 24435

( * ) Notice: Subject to any disclaimer, the term of this patent is extended or adjusted under 35 U.S.C. 154(b) by 0 days.

(21) Appl. No.: 10/963,322

(22) Filed: Oct. 12, 2004

(65) Prior Publication Data

US 2006/0075878 A1 Apr. 13, 2006

(51) Int. Cl.
*G09B 15/00* (2006.01)

(52) U.S. Cl. ...................................... 84/454; 84/470 R

(58) Field of Classification Search .................. 84/454, 84/470 R, 471 R, 472–475, 471 SR, 476, 84/477 R, 478, 479 R, 480, 481, 482, 483.1, 84/483.2, 484
See application file for complete search history.

(56) References Cited

U.S. PATENT DOCUMENTS

| | | | | |
|---|---|---|---|---|
| 4,023,460 | A | 5/1977 | Kuhnke | |
| 5,345,851 | A * | 9/1994 | Aalfs | 84/315 |
| 6,218,603 | B1 | 4/2001 | Coonce | |
| 6,288,315 | B1 * | 9/2001 | Bennett | 84/470 R |
| 6,452,080 | B1 | 9/2002 | Coonce | |
| 6,483,018 | B1 | 11/2002 | Mead | |
| 6,512,168 | B1 | 1/2003 | Cortes | |
| 2002/0096036 | A1 | 7/2002 | Tan | |

* cited by examiner

*Primary Examiner*—Kimberly Lockett
(74) *Attorney, Agent, or Firm*—Wendy W. Koba

(57) ABSTRACT

A teaching aid for instructing proper finger position on a "fret-less" stringed instrument (for example, violin, viola, cello, bass) comprises a template that is positioned along the fingerboard at the proper finger position location (i.e., "first position") for the first four half-steps associated with each string. A set of raised, "Braille-like" features is formed as a grid pattern on the surface of the template, with each row of features associated with each tone half step. Each "row" contains a set of three raised features—a separate feature located between an adjacent pair of strings. Once the template is properly positioned, the raised features are pressed out of the template and transferred to adhere to the fingerboard. By locating the raised features between the strings, the teaching aid does not interfere with sound quality or the ability to induce vibrato to the playing, while still providing a tactile clue for the proper note location for intonation purposes. Once the student has mastered proper finger placement, the raised features may be removed.

7 Claims, 1 Drawing Sheet

INTONATION AID AND POSITION LOCATOR FOR VIOLIN FAMILY OF INSTRUMENTS

TECHNICAL FIELD

The present invention relates to an intonation aid for the violin family of instruments (i.e., "fretless" stringed instruments) and, more particularly, to a set of raised, "Braille-like" features that are adhered to the fingerboard of the stringed instrument, the raised features defining the proper finger locations for the various notes to be played.

BACKGROUND OF THE INVENTION

When playing instruments of the violin family (e.g., violin, viola, cello, stringed bass), the actual tonal values created by the individual are determined by the placement of one's fingers upon the strings along the fingerboard of the instrument. As a result, misplacement of one or more fingers on the strings results in poor tonal quality or, worse, the playing of wrong notes. The process of learning to play a "fretless" instrument of the violin family is very challenging, especially for young children, as students need to learn the actual mechanics of bowing and reading music, while also remaining concerned about finger placement and tonal quality.

Various aids have been developed in the past to assist beginning players in learning the proper finger positions for the violin family of instruments. One such aid is disclosed in U.S. Pat. No. 4,023,460, issued to Horst F. Kuhnke on May 17, 1977, which describes a molded member that includes integral ridges and is affixed to the fingerboard. The ridges form an acute angle with the longitudinal axis of the fingerboard and as a result account for the difference in thickness, tension and elasticity of the lower strings as compared to these qualities of the (relatively thin) higher strings. However, as particularly illustrated in FIG. 5 of the '460 patent, the formation of such integral ridges (in the same manner as guitar frets) will necessarily interfere with the quality of sound produced and may particularly interfere with the ability to create a vibrato quality in the note. Another teaching aid, as disclosed in U.S. patent application Publication 2002/0096036, published on Jul. 25, 2002, involves the use of a visual aid of various finger patterns associated with different notes that is affixed to the fingerboard. A problem with this approach, however, is that the student must continuously look at the fingerboard to adjust his finger positions.

A preferred teaching aid would not require the need to constantly look at the fingerboard, while also not interfering with tone production, as is the case in including fret-like structures on the stringed instrument.

SUMMARY OF THE INVENTION

The need remaining in the prior art is addressed by the present invention, which relates to an intonation aid for the violin family of instruments (i.e., "fretless" stringed instruments) and, more particularly, to a set of raised, "Braille-like" features that are adhered to the fingerboard of the stringed instrument, the raised features defining the proper finger locations for the various notes to be played.

In accordance with the present invention, a template is formed that includes a plurality of the raised features disposed in a grid-like pattern. In particular, the raised features are disposed in a set of rows and columns associated with proper finger locations for a set of notes (i.e., "first position", or "second position", etc.), with the features located between adjacent strings. The template is placed on the fingerboard at a specified location and the raised features are pressed out of the template and transferred to adhere to the fingerboard at the proper locations. For each position, the spacing between adjacent features is modified as the spacing between strings increases.

In a preferred embodiment of the present invention, the raised features are removably attached to the fingerboard so that once the student has mastered the finger positions, the raised features can be removed.

It is an advantage of the arrangement of the present invention that the raised features used to "feel" the proper position are of minimal height and disposed between the strings. Therefore, the raised features will not interfere with tone quality or the ability to introduce a vibrato effect to the tone(s).

Other and further advantages of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
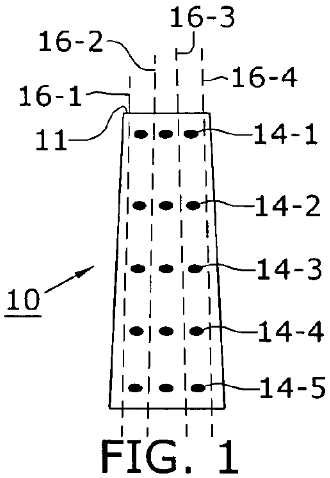
FIG. 1 illustrates an exemplary removable template of raised features for teaching proper finger positions.

FIG. 1 illustrates an exemplary removable template 10 of the present invention used to aid finger location and improve intonation when learning to play a stringed instrument of the violin family (e.g., violin, viola, cello, bass). As illustrated in FIG. 1, template 10 includes a plurality of raised features 12 disposed in a grid-like pattern as shown to provide the proper location along the fingerboard for accurate tone results. As shown, raised features 12 are disposed in a set of five rows, denoted 14-1, 14-2, 14-3, 14-4 and 14-5 in FIG. 1. In accordance with the present invention, the raised features are disposed along a row so as to be located between a pair of adjacent strings. A set of strings is illustrated in phantom in FIG. 1, with the lowest string being leftmost, indicating the placement of raised features 12 between adjacent strings, such as strings 16-2 and 16-3.

Raised features 12 are arranged, as shown below, so as to align with the position along the fingerboard of a stringed instrument that raises the tone value of an "open string" (no finger on string) a half-step at a time. For example, when raised features 12 are attached to the fingerboard of a violin, the lowest string 16-1 is a "G" string, so the first finger location (associated with row 14-1) is "G♯"/"A♭", the second finger location (associated with row 14-2) is "A", the third finger location (associated with row 14-3) is "A♯"/"B♭", and so on. By virtue of placing raised features 12 between adjacent strings in accordance with the present invention, the strings may be fully pressed into the fingerboard, thus providing the best tone quality and ability to add vibrato to the note or notes being played.

Figure 2:
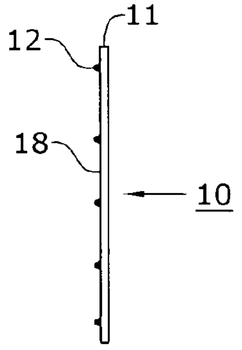
FIG. 2 is a side view of the template of FIG. 1, illustrating the height of the raised features.

The displacement of raised features 12 above the surface template 10 is relatively minimal, as illustrated in FIG. 2, which contains a side view of template 10 of FIG. 1, showing the position of raised features 12 on top surface 18 of template 10. Raised features 12 are sized to be sufficient to provide a tactile clue to the student regarding the proper finger location. As long as the raised features are sufficiently large so as to provide a tactile sense to the student, while not interfering with the vibration of the adjacent strings, a various range of sizes may be employed. It is also to be understood that the spacing between adjacent rows of raised features is controlled to provide the desired half-step tone spacing. Thus, the rows will gradually become closer together in the direction from the nut to the bridge along the fingerboard of the instrument.

Figure 4:
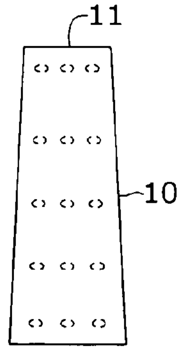
FIG. 4 illustrates an exemplary template subsequent to the removal of the raised features.
Figure 3:
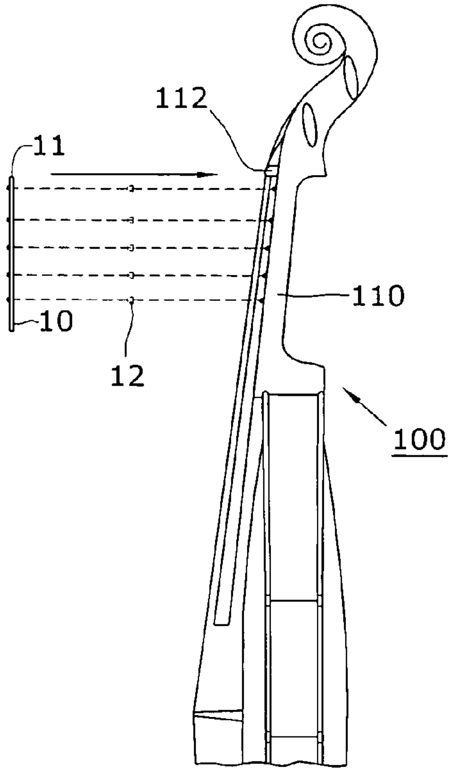
FIG. 3 is a side view of the upper portion of a stringed instrument and inventive template, illustrating process of adhering the raised features to the fingerboard.

In use, template 10 is positioned underneath strings 16 and against a fingerboard 110 of a violin 100, as shown by the directional arrows in the exploded view of FIG. 3. It is to be understood that is use, template 10 is slid in along the side of violin 100, between strings 16 and fingerboard 110. In particular, template 10 is positioned with its top edge 11 against a notched nut 112 at the top of fingerboard 110 so that raised features 12 are located at the proper note values. Once in proper position, pressure is applied to raised features 12 so as to transfer raised features 12 to the surface of fingerboard 110 where they will remain adhered in place. FIG. 4 illustrates an exemplary template 10 once raised features 12 have been removed by transference. Template 10 is then removed and reused, as needed.

Figure 5:
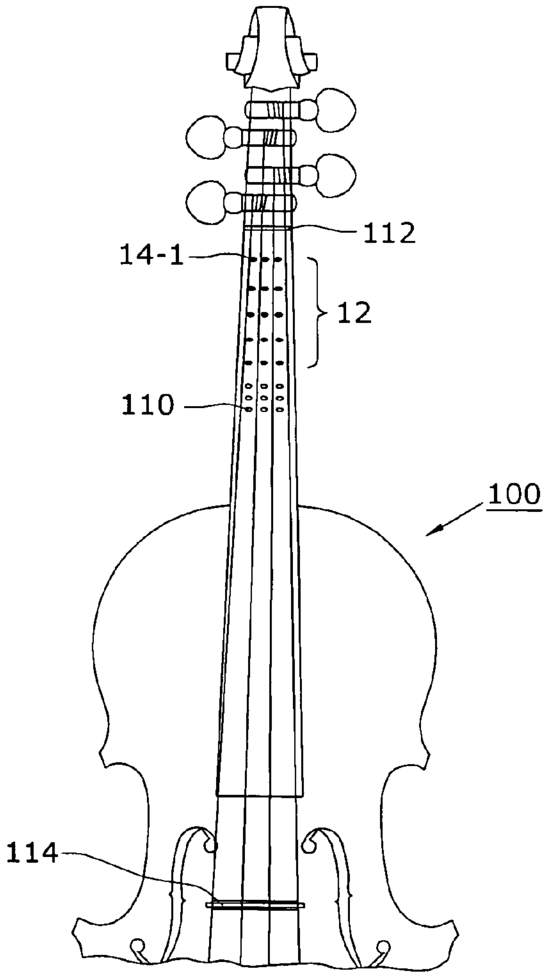
FIG. 5 is a front view of an upper portion of a stringed instrument, illustrating the location of the Braille-like raised features that form the intonation aid of the present invention.

FIG. 5 contains a front partial view of violin 100 with raised features 12 adhered in place between adjacent strings 16. By virtue of using template 10 in accordance with the present invention, the top row 14-1 of raised features 12 is properly positioned along fingerboard 110 so as to raise the tonal value of each open string by a half-note in value. While the arrangement in FIG. 5 illustrates the placement of raised features 12 for notes in the "first position", various other templates having the proper locations for raised features associated with second or third position may also be formed. Alternatively, a template may be formed that includes raised features for two or more positions, thus having raised features disposed further along the extent of the fingerboard toward the bridge 114 of violin 110.

It is to be understood that the location of bridge 114 with respect to template 10 needs to be precisely controlled so that the proper finger positions will correspond to the desired note values. That is, if bridge 114 is misaligned with respect to template 10, the finger positions associated with raised features would be either too low or too high in tonal value. For example, when using the inventive template with a 4/4 size violin, a spacing of approximately 13" from the nut to the bridge is appropriate. Any adjustments in tonal value that are required can then be made by adjusting the location of the bridge.

It is to be understood that a different template may be designed to provide the proper grid-like pattern of raised features required to teach the "second position" note locations, as illustrated by phantom raised features 12 in FIG. 5. The "third position" note locations may also be taught with a similarly designed template. Alternatively, a single template including the proper finger locations for two or more of the positions may be formed and is considered to fall within the scope of the present invention. Indeed, the template may be formed to also define the proper location for the bridge at the far end of the fingerboard. Further, it is to be understood that each "family member" of the stringed instrument family will require its own set of templates. That is, a first template including a first, pre-defined, grid-like pattern of raised features may be used as the inventive intonation aid for "first position" on a violin, and a second template (of a different size) including a second, pre-defined, grid-like pattern of raised features would be required for use with a cello. Additionally, student models of the instruments may be formed of a smaller size (for example, 2/4 or 3/4-sized instruments), where the size and disposition of raised features on a template will accordingly be modified for each different instrument size.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents.

The invention claimed is:

1. An intonation aid for use with a fretless stringed instrument, the intonation aid comprising a template including a plurality of raised surface features disposed in a grid pattern, the grid pattern of rows and columns, the raised surface features for being transferred from the template and adhered to a fingerboard of a stringed instrument upon the application of pressure to the plurality of raised surface features, where the spacing between adjacent rows of features as formed on the template is controlled to define a half-step tonal value and the spacing between adjacent columns of features as formed on the template is controlled such that upon transference the raised surface features are positioned between adjacent strings without physically contacting either one of the adjacent strings of the stringed instrument.

2. An intonation aid as defined in claim 1 wherein the plurality of raised surface features is configured to be removably adhered to the stringed instrument fingerboard.

3. An intonation aid as defined in claim 1 wherein the grid pattern of raised features is disposed so as to define the half-step tonal values associated with a single, pre-defined playing position.

4. An intonation aid as defined in claim 3 wherein the pre-defined playing position is "first position" and the grid of raised features is disposed to define the half-step spacing associated with "first position".

5. An intonation aid as defined in claim 3 wherein the pre-defined playing position is "second position" and the grid of raised features is disposed to define the half-step spacing associated with "second position".

6. An intonation aid as defined in claim 3 wherein the pre-defined playing position is "third position" and the grid of raised features is disposed to define the half-step spacing associated with "third position".

7. An intonation aid as defined in claim 1 wherein the grid pattern of raised features comprises a plurality of rows of raised features, disposed to define the half-step spacing associated with at least two different finger positions.

* * * * *